CHAIN FALL PREVENTION DEVICE FOR BICYCLE

Filed April 22, 1969 2 Sheets-Sheet 1

FIG. I.

INVENTOR
TETSUO MAEDA
BY
Ernest G. Montague
ATTORNEY.

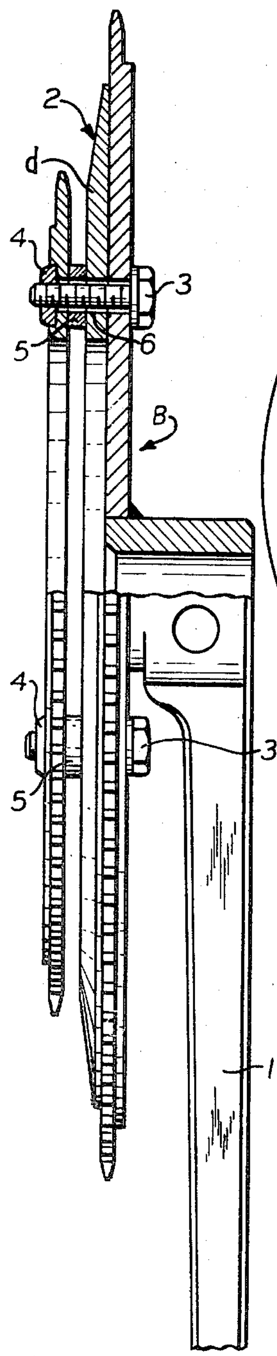
FIG. 2.
FIG. 3.
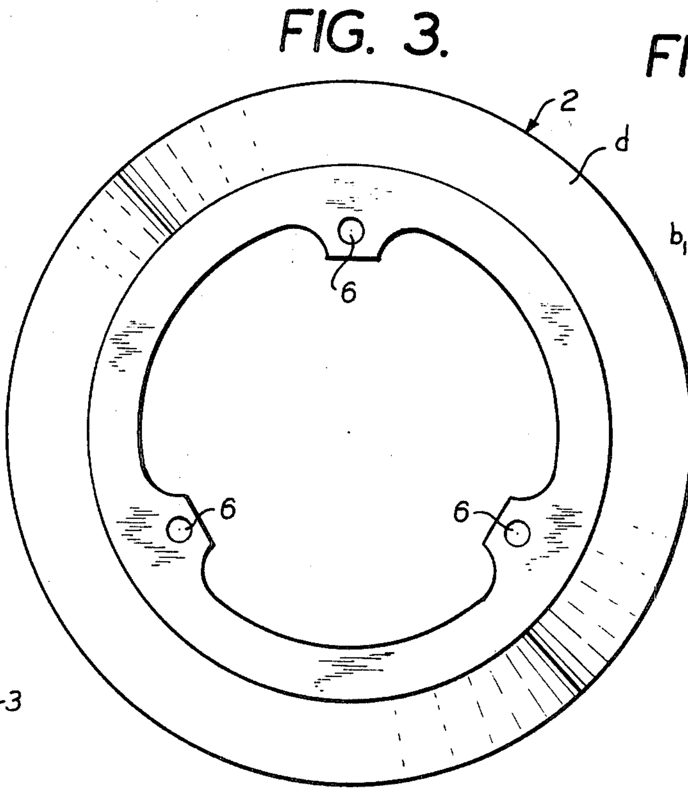
FIG. 5.
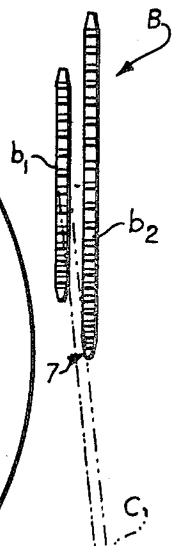
FIG. 4.
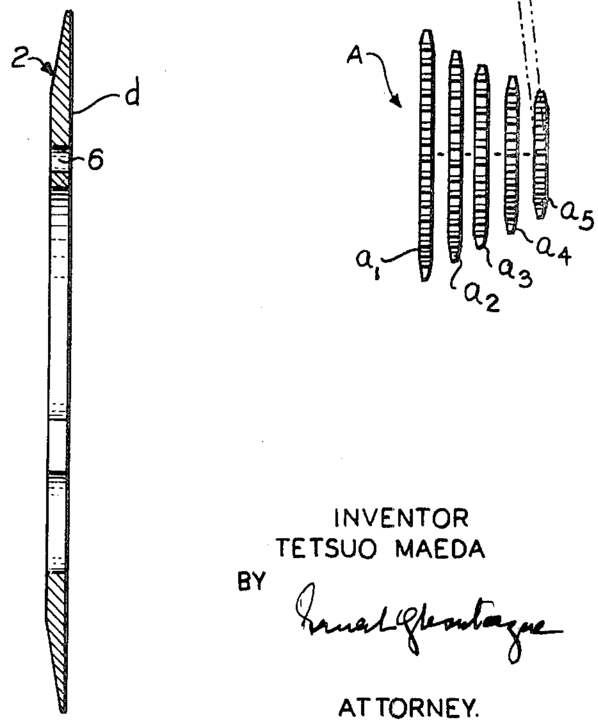
INVENTOR
TETSUO MAEDA
BY [signature]
ATTORNEY.

3,550,465
Patented Dec. 29, 1970

3,550,465

CHAIN FALL PREVENTION DEVICE FOR BICYCLE

Tetsuo Maeda, 12 Hamaderakoencho 1-cho, Sakai, Osaka, Japan

Filed Apr. 22, 1969, Ser. No. 818,268
Claims priority, application Japan, Mar. 7, 1969 (utility model), 44/20,885
Int. Cl. F16h 7/18, 55/30
U.S. Cl. 74—240 6 Claims

ABSTRACT OF THE DISCLOSURE

A chain fall prevention device, comprising a driving gear adapted to be operatively secured to a driving gear crank including, a first circular gear having a first plurality of first gear teeth on the outer periphery thereof, a second circular gear having a second plurality of second gear teeth on the outer periphery thereof, the second circular gear operatively secured to the first circular gear spaced axially relative thereto and having a smaller outer diameter than that of the first circular gear, a chain guide plate formed at least in part with a slanting slope at one side thereof widening in a direction inwardly away from the outer peripheral edge of the chain guide plate, and the chain guide plate positioned with its other side adjacent to the first circular gear and between the first and second circular gears and co-axial therewith thereby preventing the chain from falling down between the gears and providing a smooth shifting of gears and operation.

The present invention relates to a device for preventing the chain from falling, in bicycles, or the like.

As well known, driving a bicycle is performed by a driving chain operatively engaging a rear or subordinate gear fitted on the rear wheel side of a bicycle and a driving gear driven by the bicycle pedal, the latter when actuated causing the bicycle wheels to turn.

In order to change the speed of the bicycle to various stages, several gears are fitted on the subordinate gear and the gear proportion is changed by shifting the chain. However even if several subordinate gears fit, e.g., four or five, the change stages are limited only to this number, i.e., four or five, respectively, and the gear teeth number cannot be largely changed since the diameter of the gear is small. Consequently it is difficult to effect a wide plurality of speed variations.

If several gears are further disposed on the driving gear, the above-mentioned speed variation stages can be multiplied. The teeth number can be greatly changed and the speed variations greatly varied, since the driving gear has a larger diameter. For example, in the case where the subordinate gears constitute five gears and the driving gears constitute two gears, ten speed variation stages are provided. At the same time, when the chain engaging the driving gear is shifted to engage another gear, increased speed variations can be made as compared with the case where the chain is shifted engaging the subordinate gear.

For this reason in a bicycle used for cycling, the number of the gears on the subordinate side and on the driving side, respectively, constitute a plurality of gears and both a front speed variation and a rear speed variation are made possible. However this case has one defect. This defect is caused by the following effect. If the difference in the teeth number on the driving side gears $b_1$ and $b_2$ (referring here to FIG. 5), namely the difference of the gear diameters, is increased, and since a plurality of gears are disposed respectively on the subordinate motion gear side (arrow A) and the driving side (arrow B) as shown in FIG. 5, when the chain *c* engages the gear $a_5$ having the smallest diameter at the outermost side of the subordinate gears and also engages the smallest diameter gear $b_2$ of the driving gears, then the chain *c* contacts the side portion 7 of the larger adjacent driving gear $b_1$. This not only obstructs the smooth rotation of the chain, but it also causes wear and tear to the side of the chain *c* and to the gear $b_1$. To eliminate such a defect, it is favorable to increase the spacing between the gears $b_1$ and $b_2$. However, when the chain *c* is shifted from gear $b_1$ to gear $b_2$ so as to vary the speed of the bicycle, it is frequently caught in the two gears and it is tedious or difficult to again hang or engage the chain, once again, on the driving gear.

It is an object of the present invention to prevent the chain from falling down between the gears.

It is another object of the present invention to provide a chain fall prevention device, comprising a driving gear including a first circular gear having a first plurality of first gear teeth on the outer periphery thereof, a second circular gear having a second plurality of second gear teeth on the outer periphery thereof, the second circular gear operatively secured to the first circular gear and spaced axially relative thereto and having a smaller outer diameter than that of the first circular gear, the first plurality of teeth being of a number greater than that of the second plurality of teeth, a chain guide plate formed at least in part with a slanting slope at one side thereof widening in a direction inwardly away from the outer peripheral edge of the chain guide plate, and the chain guide plate positioned with its other side adjacent to the first circular gear between the first and second circular gears and co-axial therewith.

With these and other objects in view, which will become apparent in the following detailed description, the present invention will be clearly understood in connection with the accompanying drawings, in which:

FIG. 2 is a front elevation partly in axial section of the device;

FIG. 3 is a side elevation of the chain guide plate;

FIG. 4 is an axial section of the chain guide plate; and

FIG. 5 is a schematic illustration showing the defects of not using the device of the present invention.

Figure 1:
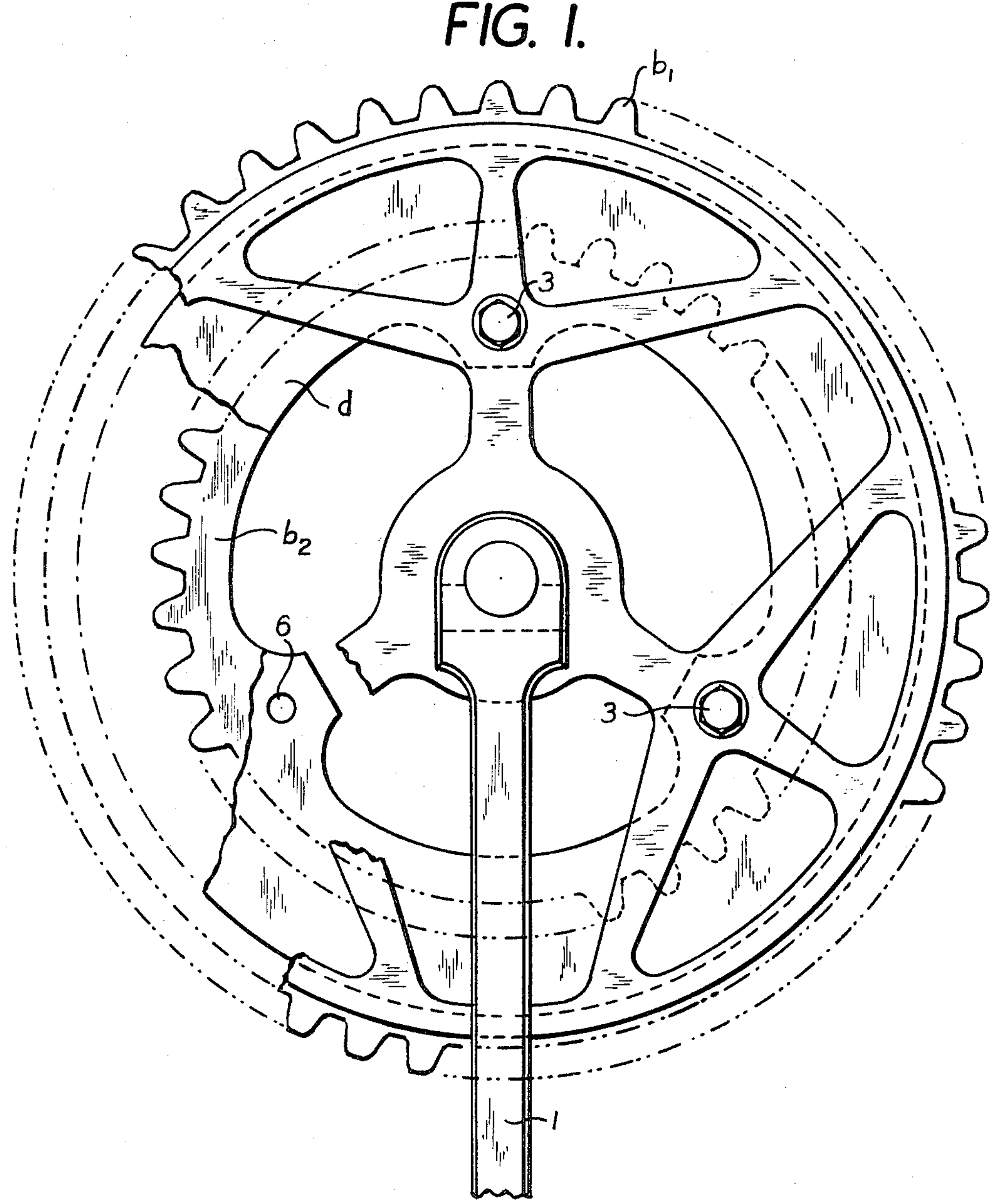
FIG. 1 is a side elevation partly broken away showing a gear portion fitted to the device of the present invention.

Referring now to the drawings, the chain fall prevention device of the present invention comprises a chain guide plate *d* having a beveled outer peripheral slope 2 at one side thereof slanting from a large diameter gear $b_1$ (FIG. 2) to a smaller diameter gear $b_2$ spaced therefrom. The chain guide plate *d* is secured to the side of gear $b_2$ between the gears $b_1$ and $b_2$ on the driving side gears B of the bicycle for forward speed variations. The gear $b_2$ has a different number of teeth, viz., the outer diameter is different. A gear crank 1 is secured at the other side of the gear $b_1$.

The chain guide plate *d* is secured against the gear $b_1$ by screws 3 passing through the gear $b_1$ and through the plate *d* in holes 6 formed in the inner part of the chain guide plate *d*. Ring 5 is positioned on screws 3 between the plate *d* and gear $b_2$ regulating the spacing or opening between the chain guide plate *d* and the small diameter gear $b_2$. The screws finally pass through openings in the gear $b_2$ and operatively secure the assembly to the gear crank 1, with nuts 4 on the screws 3 pressing against the outer side of the gear $b_2$.

The chain guide plate *d* provides the slope 2 slanting from the large diameter gear $b_1$ at the side thereof adjacent the periphery thereof to the small diameter gear $b_2$, between the gear $b_1$ and the gear $b_2$. Therefore, when the chain is transferred from engagement with the gear $b_1$ to the gear $b_2$, the chain running off the gear $b_1$ is guided and transferred along the slope 2 to the gear $b_2$. Consequently the change of engagement or hanging of the chain can be executed smoothly without falling of the chain between the gears $b_1$ and $b_2$. That is, the opening or spacing between the gear $b_1$ and the gear $b_2$ can be increased by installing the device of the present invention, and furthermore, even if the chain engages and hangs on both the subordinate motion gear $a_5$ (FIG. 5) and the driving gear $b_2$, there can be no apprehension that the chain contacts the gear $b_1$, and shifting of the chain for gear change engagement also can be performed smoothly.

The chain guide plate *d* provided with the slope 2 is preferably moulded with synthetic resin, or made by processing a metallic plate with a press, or the like, for example.

Although as shown in the drawings, two driving gears $b_1$, and $b_2$ are provided, when more than two gears are provided, a chain guide plate *d* is secured between every two spaced adjacent gears, where there may otherwise be a possibility of the chain falling down due to a wide spacing between the adjacent gears.

By the present invention the effective free space between adjacent gears is reduced to less than the width of the chain (e.g., between the facing sides of gear $b_2$ and the plane face of the plate *d*) so that the chain may not fall therebetween, while permitting the gear teeth of the adjacent gears to be spaced apart as far as desired yet requiring no greater gear sheet thickness, as well as simultaneously providing a slanting guide slope from the larger diameter gear toward the periphery of the smaller diameter gear thereby aiding the smooth chain to gear shifting transition.

While I have disclosed several embodiments of the present invention, it is to be understood that these embodiments are given by example only and not in a limiting sense.

I claim:

1. A chain fall prevention device, comprising a driving gear adapted to be operatively secured to a driving gear crank including, a first circular gear having a first plurality of first gear teeth on the outer periphery thereof, a second circular gear having a second plurality of second gear teeth on the outer periphery thereof, said second circular gear operatively secured to said first circular gear and spaced axially relative thereto and having a smaller outer diameter than that of said first circular gear, said first plurality of teeth being of a number greater than that of said second plurality of teeth, a chain guide plate formed at least in part with a slanting slope at one side thereof widening in a direction inwardly away from the outer peripheral edge of said chain guide plate, and said chain guide plate positioned with its other side adjacent to said first circular gear between said first and second circular gears and co-axial therewith.

2. The device, as set forth in claim 1, wherein said chain guide plate is secured to said first circular gear.

3. The device, as set forth in claim 1, wherein said chain guide plate is annular, a plurality of screws passing through said first circular gear, said chain guide plate and said second circular gear, in that order, a spacing ring positioned on said screws between said chain guide plate and said second circular gear, and a nut disposed on each of said screws thereby operatively securing theretogether said second circular gear, said chain guide plate and said first circular gear.

4. The device, as set forth in claim 1, wherein said slanting slope forms in cross-section a straight-line starting from the outer peripheral edge of said chain guide plate, said outer peripheral edge of said chain guide plate having a smaller diameter than the diameter of said first plurality of teeth of said first circular gear, and said slanting slope extending inwardly to a position approximately laterally adjacent said second plurality of gear teeth of said second circular gear.

5. The device, as set forth in claim 4, wherein one side of said first circular gear has a plane surface, against which said other side of said chain guide plate is positioned, and said other side of said chain guide plate forms a plane annular surface.

6. The device, as set forth in claim 5, wherein said one side of said chain guide plate radially inwardly of said slanting slope forms a narrow plane surface, said screws passing through said narrow plane surface at equally spaced angular positions, and said spacing rings press on said chain guide plate entirely against said narrow plane surface thereof.

References Cited

UNITED STATES PATENTS

| | | | |
|---|---|---|---|
| 2,146,882 | 2/1939 | Baker | 74—611X |
| 3,477,303 | 11/1969 | Brilando | 74—243 |

FOREIGN PATENTS

| | | | |
|---|---|---|---|
| 641,308 | 8/1950 | Great Britain | 74—243 |

JAMES A. WONG, Primary Examiner

U.S. Cl. X.R.

74—243, 611